Feb. 20, 1934.  C. SAURER  1,948,476
RUBBER SHOCK AND VIBRATION INSULATOR
Filed Aug. 13, 1930  7 Sheets-Sheet 3

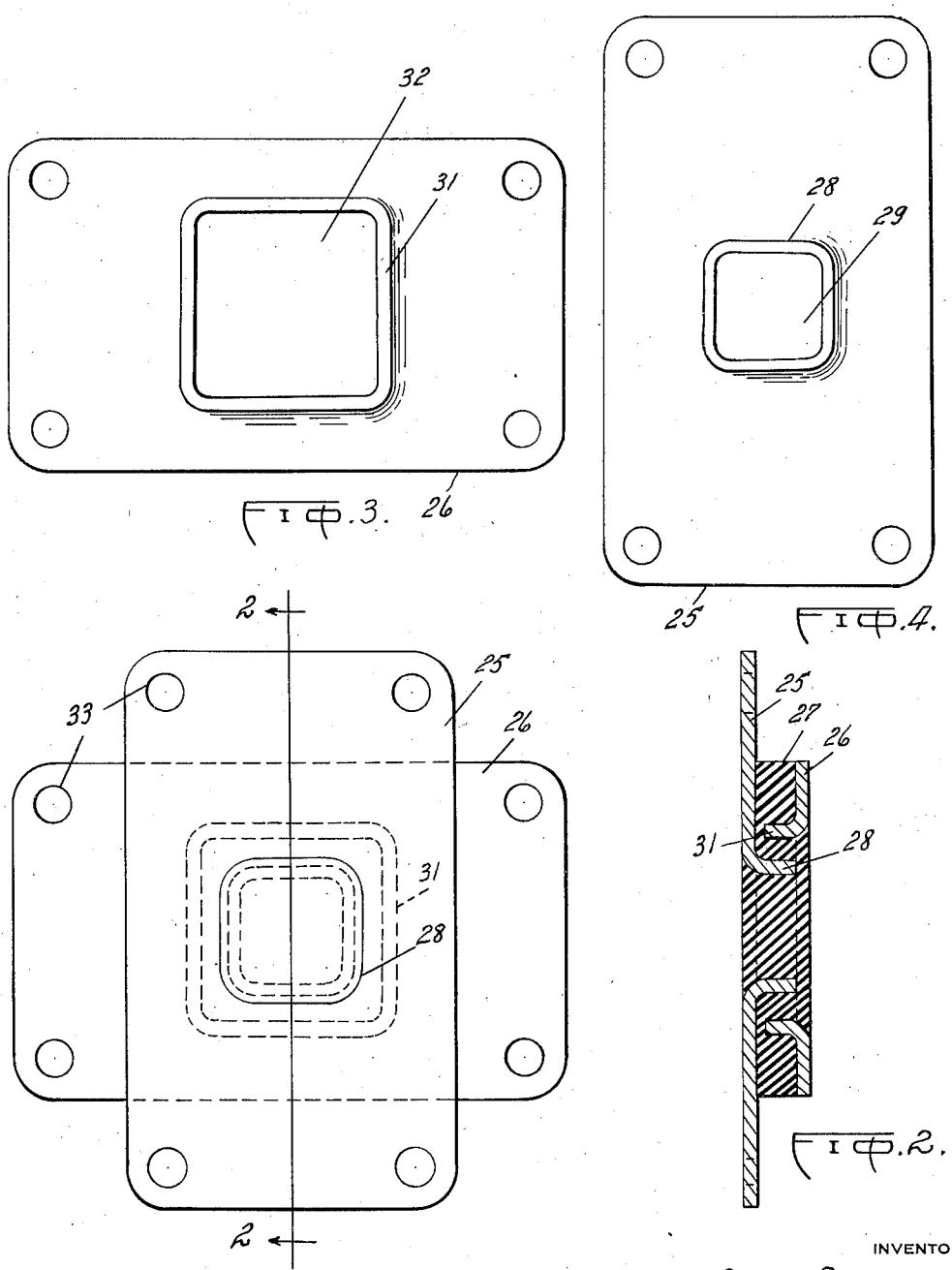

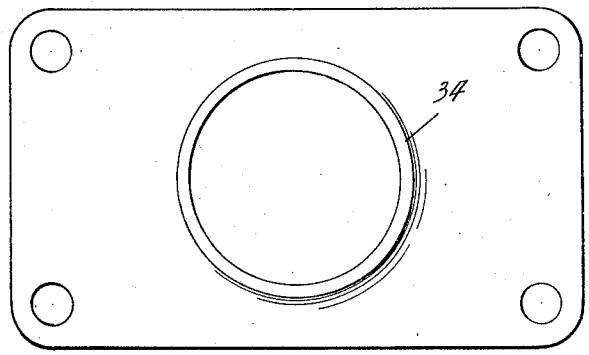
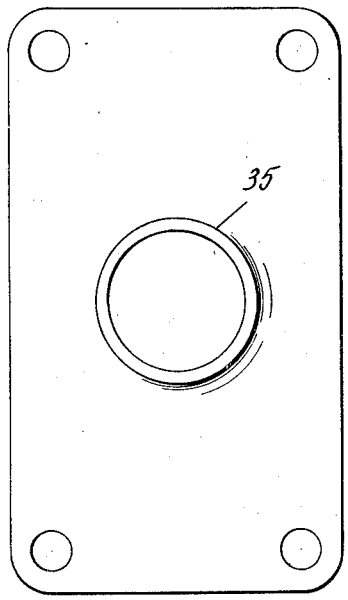
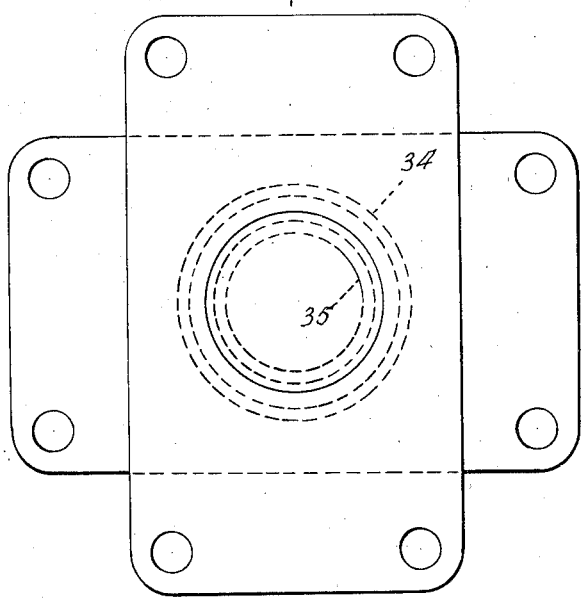
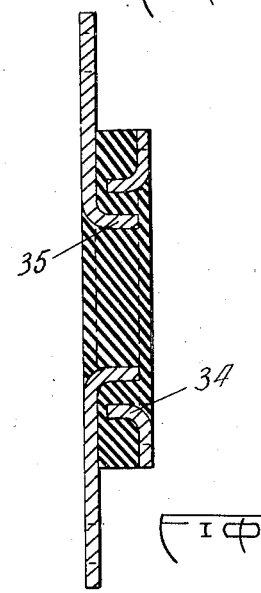

INVENTOR
CURT SAURER.
BY
ATTORNEYS.

Feb. 20, 1934.    C. SAURER    1,948,476
RUBBER SHOCK AND VIBRATION INSULATOR
Filed Aug. 13, 1930    7 Sheets-Sheet 4

INVENTOR
CURT SAURER.
BY
Ely H Barrow
ATTORNEYS.

Feb. 20, 1934.   C. SAURER   1,948,476
RUBBER SHOCK AND VIBRATION INSULATOR
Filed Aug. 13, 1930   7 Sheets-Sheet 5
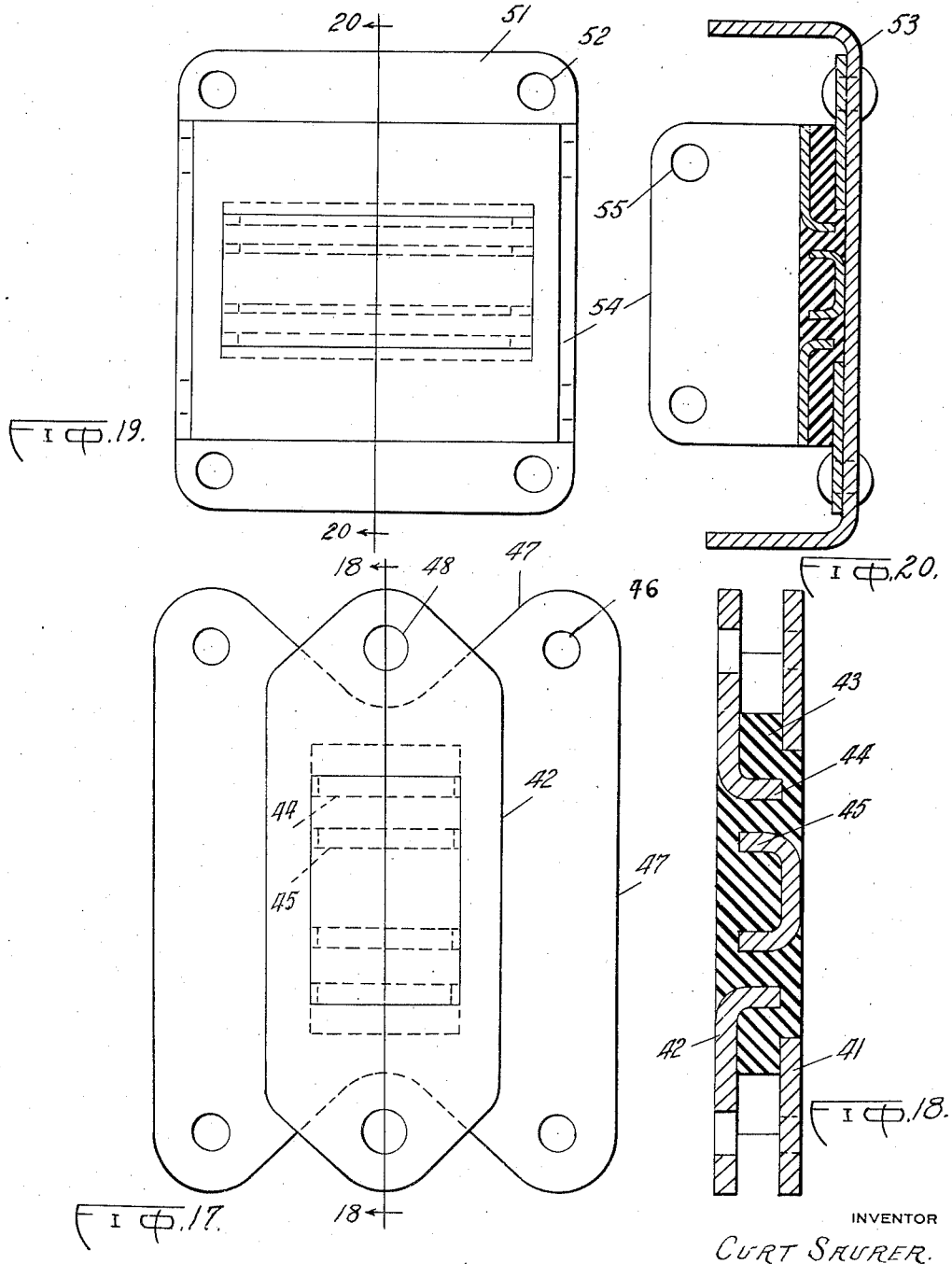

Feb. 20, 1934.　　　C. SAURER　　　1,948,476
RUBBER SHOCK AND VIBRATION INSULATOR
Filed Aug. 13, 1930　　7 Sheets-Sheet 6

INVENTOR
CURT SAURER
BY
ATTORNEYS.

Feb. 20, 1934.    C. SAURER    1,948,476
RUBBER SHOCK AND VIBRATION INSULATOR
Filed Aug. 13, 1930    7 Sheets-Sheet 7
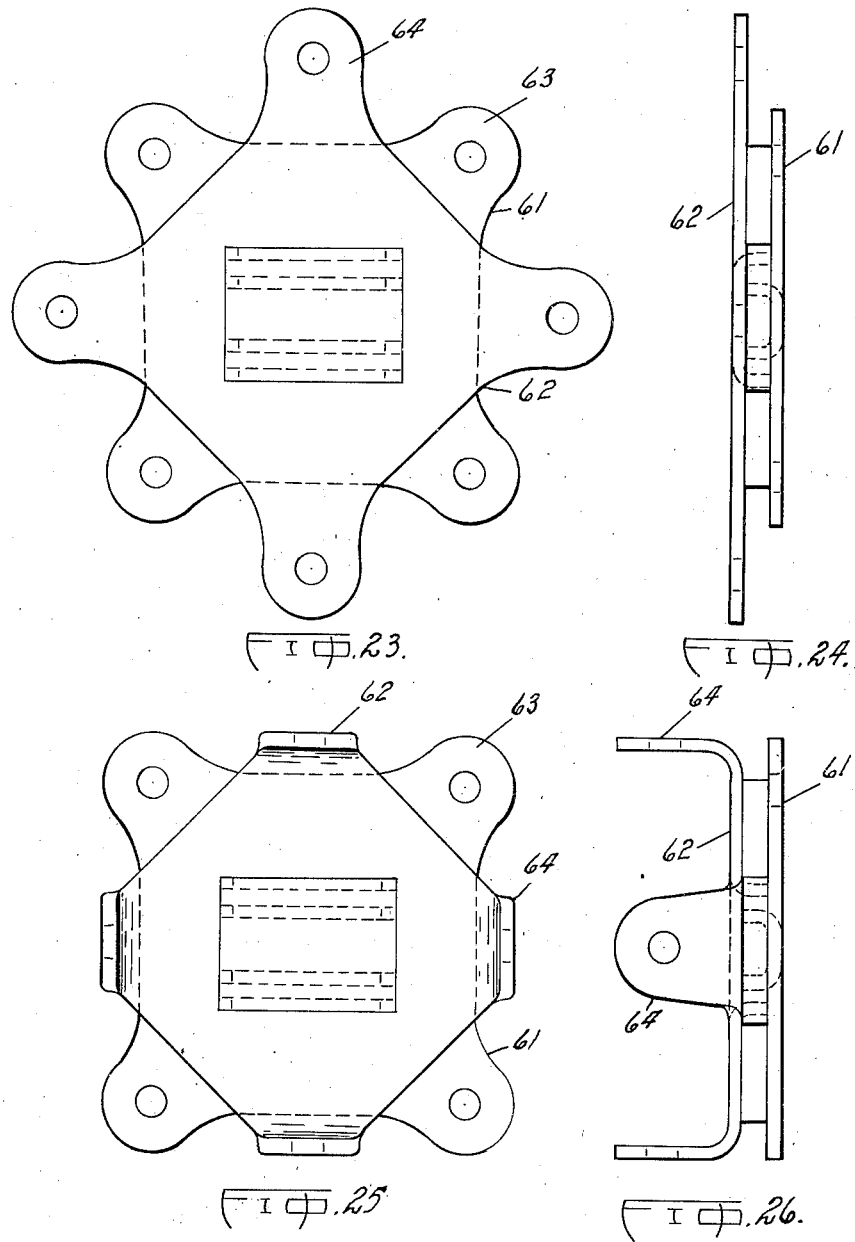
INVENTOR
CURT SAURER.
BY
Ely & Barrow
ATTORNEYS.

Patented Feb. 20, 1934

1,948,476

UNITED STATES PATENT OFFICE 1,948,476

RUBBER SHOCK AND VIBRATION INSULATOR

Curt Saurer, Akron, Ohio, assignor to The Firestone Tire & Rubber Company, Akron, Ohio, a corporation of Ohio Application August 13, 1930. Serial No. 475,086

3 Claims. (Cl. 248—14.2)

This invention relates to rubber shock and vibration insulators of a type particularly adapted for use as motor supports or the like in automobiles.

The general purpose of the invention is to provide an inexpensive, efficient insulator which is adaptable to a plurality of uses and which will not fail mechanically even if the rubber therein does fail.

A further object of the invention resides in the provision of a method in which flat plates are vulcanized to the rubber cushion and thereafter are bent to the desired form so that the molding operation may be more quickly, efficiently and cheaply carried out.

The above and other objects of the invention are achieved by the devices illustrated in the accompanying drawings and described below, it being understood that the invention is not limited to the exact details shown and described.

In the drawings:

Figure 1 is a side elevation of a complete insulator embodying the invention.

Figure 2 is a section taken on line 2—2 of Figure 1.

Figure 3 is a side elevation of one of the insulator plates shown in Figure 1.

Figure 4 is a side elevation of the other of the insulator plates shown in Figure 1.

Figure 5 is a side elevation of a slightly modified form of the invention.

Figure 6 is a sectional view on line 6—6 of Figure 5.

Figure 7 is a side elevation of one of the insulator plates shown in Figure 5.

Figure 8 is a side elevation of the other insulator plate shown in Figure 5.

Figure 17 is a side elevation of a modified form of insulator.

Figure 18 is a section taken on line 18—18 of Figure 17.

Figure 19 is a side elevation of a modified form of insulator.

Figure 20 is a sectional view taken on line 20—20 of Figure 19.

Figure 23 is a side elevation, before bending, of a modified form of insulator in which the plates are bent after the vulcanization of the rubber.

Figure 24 is an end elevation thereof.

Figure 25 is a side elevation of the insulator shown in Figure 23 after bending.

Figure 26 is an end elevation of the insulator shown in Figure 25.

Figure 11:
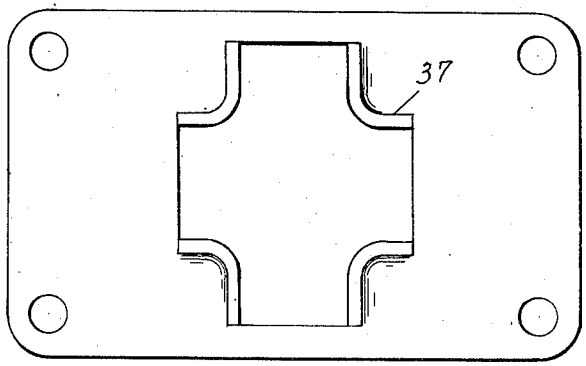
Figure 11 is a side elevation of one of the insulator plates shown in Figure 9.
Figure 12:
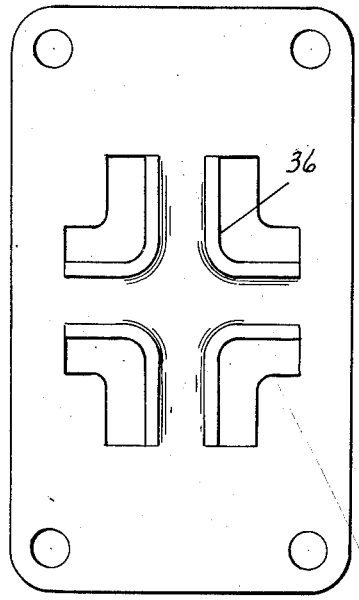
Figure 12 is a side elevation of the other of the insulator plates shown in Figure 9.
Figure 9:
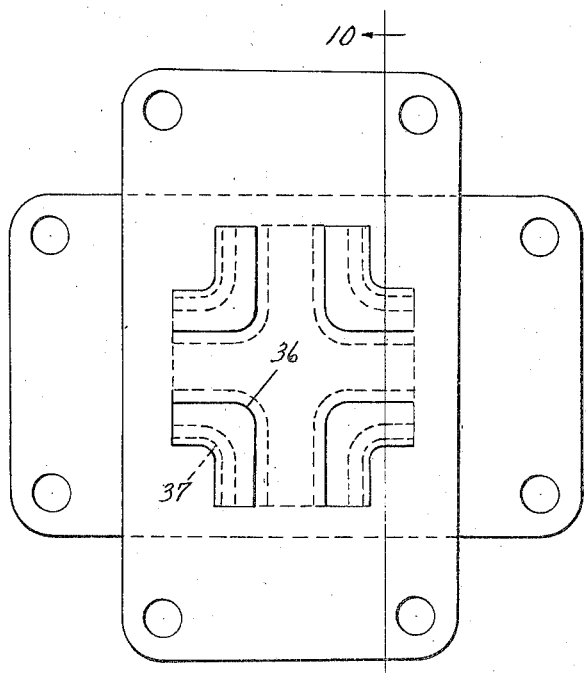
Figure 9 is a side elevation of a modified form of the invention.
Figure 10:
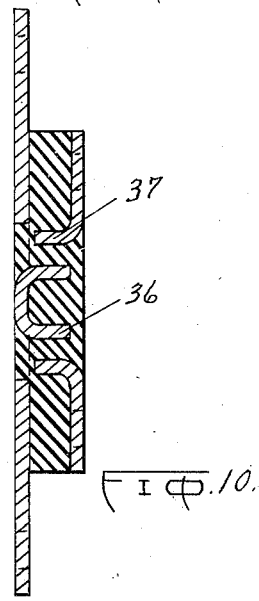
Figure 10 is a sectional view taken on line 10—10 of Figure 9.
Figure 15:
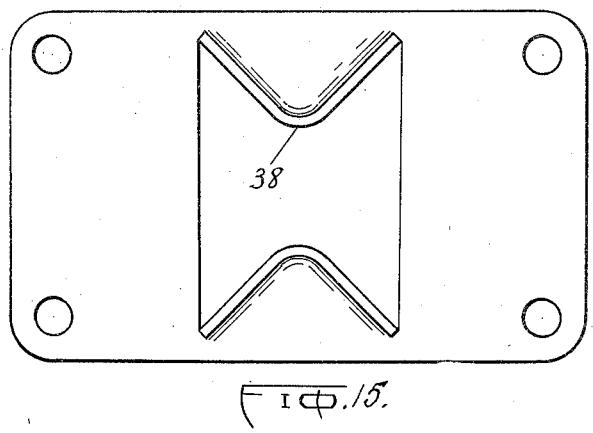
Figure 15 is a side elevation of one of the insulator plates shown in Figure 13.
Figure 16:
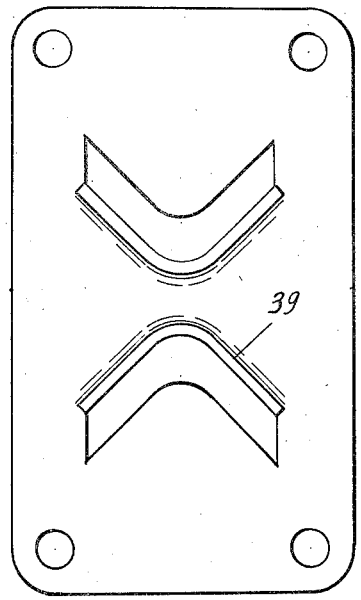
Figure 16 is a side elevation of the other insulator plate illustrated in Figure 13.
Figure 13:
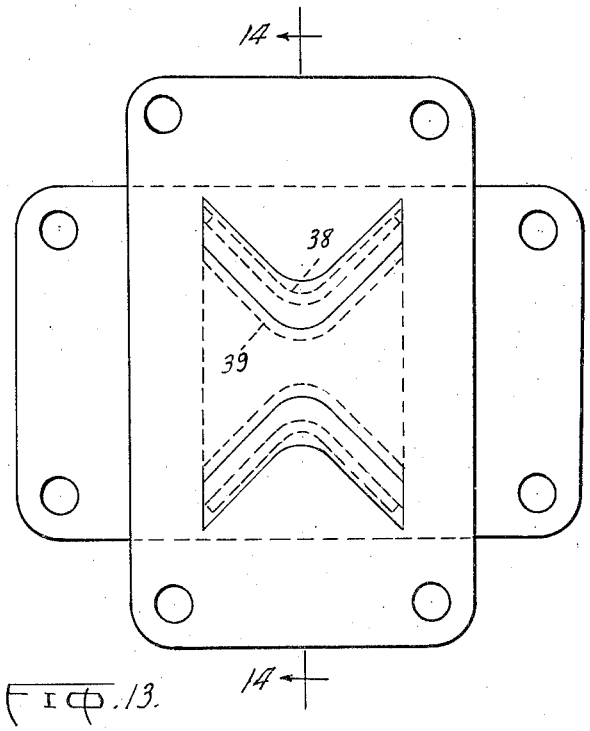
Figure 13 is a side elevation of a modified form of insulator.
Figure 14:
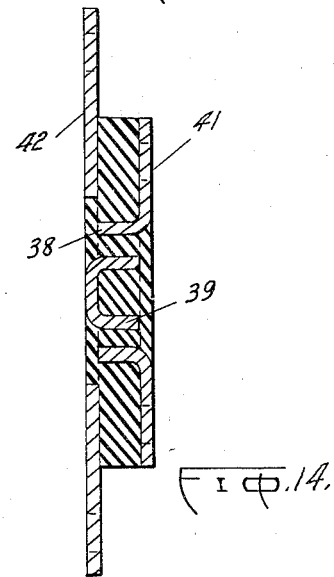
Figure 14 is a sectional view taken on line 14—14 of Figure 13.

The form of the invention shown in Figures 1 to 4 comprises a pair of oppositely-turned, rectangular plates 25 and 26 and a rubber cushion 27 which is vulcanized to and between the plates which preferably are of suitable metal or are suitably plated or coated to insure a tight weld between the rubber and the plates. The plate 25 is formed with a raised square flange or rib 28 which may be punched out of the center of the plate leaving it open as at 29. The plate 26 is formed with a somewhat larger square rib or flange 31 which may also be punched out of the plate leaving the center open as at 32. As illustrated in Figure 2 the ribs 28 and 31 will interlock so that mechanical failure even upon rubber failure will be prevented.

In operation the various portions of the rubber in the insulator will be under shear, tension and compression stresses which gives a maximum of resiliency to the insulator while maintaining the wearing properties thereof. The oppositely extending ends of the rectangular plates are apertured as at 33 whereby the insulator may be secured between the parts to be insulated.

The form of the invention illustrated in Figures 5 to 8 is similar to that shown in Figures 1 to 4 but instead of having square cooperating flanges the flanges are made round as indicated at 34 and 35.

The flanges may be formed cross-shaped as indicated by the numerals 36 and 37 in Figures 9 to 12.

Or as illustrated in Figures 13 to 16 the flanges may be X-shaped as at 38 and 39.

The form of the invention shown in Figures 17 and 18 comprises a back plate 41, a front plate 42 and a rubber pad or cushion 43 vulcanized to and between said plates. The plates are formed with cooperating parallel flanges 44 and 45 which may be formed from bent up portions of the plates. As illustrated in Figure 17 the front plate 42 is relatively narrow so that the relatively wider back plate 41 extends to either side thereof. The corners of the back plate are provided with holes 46 whereby it may be secured to one of the members to be insulated. The portions of the back plate directly behind the ends of the front plate are cut away as at 47 so that bolts or other fastening means may be passed through holes 48 in the ends of the front plate whereby the front plate may be secured to the other of the members to the insulated.

In Figures 19 and 20 the flanges and body portion of the insulator is similar to that shown in Figures 17 and 18 but are made somewhat wider. In this form of the invention the back plate is extended above and below the front plate as at 51, which extending portions are apertured as indicated by the numeral 52 for the reception of suitable fastening means whereby the insulator may be secured to one of the members to be insulated such as the channel iron 53.

The front plate is formed with outwardly extending parallel flanges 54 which are provided with holes 55 for the reception of fastening means.

Figure 22:
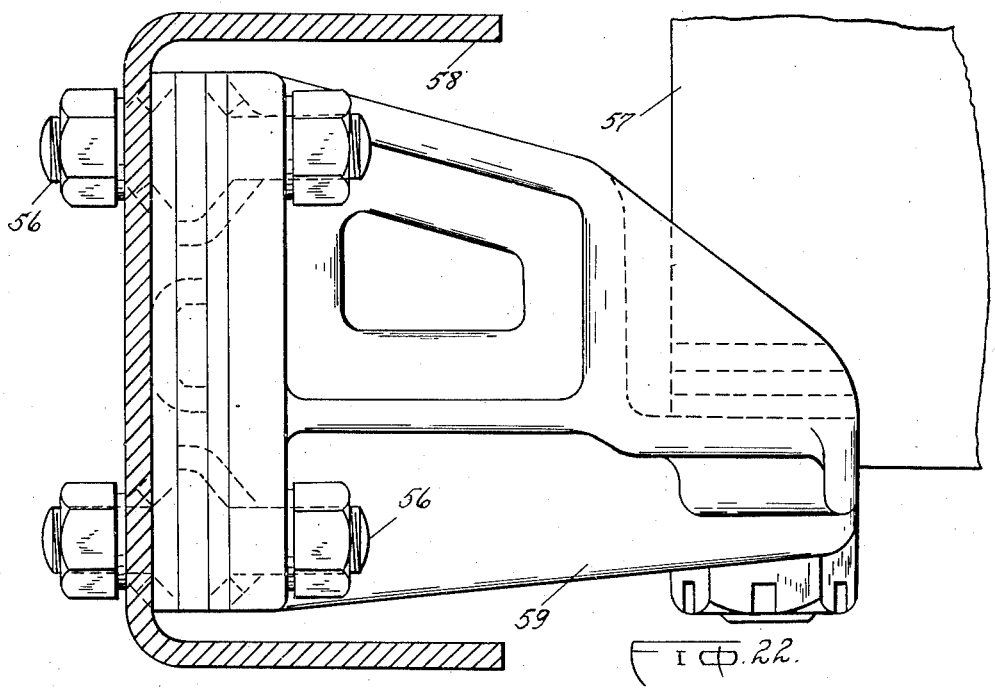
Figure 22 is an end view illustrating one way the insulator shown in Figure 21 may be mounted.
Figure 21:
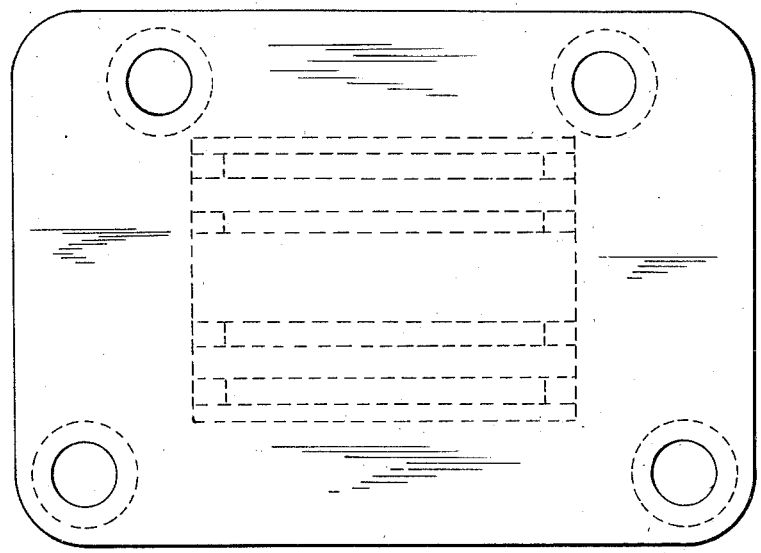
Figure 21 is a side elevation of an insulator similar to that shown in Figures 17 and 19 but which is designed to be mounted in a different way.

The form of the invention illustrated in Figures 21 and 22 is similar to that illustrated in Figures 19 and 20 but is mounted or secured between the parts to be insulated in a different way. The front and back plates of the insulator are provided with countersunk holes which receive outwardly extending flat-headed bolts 56. In Figure 22 the insulator is used to insulate and connect an automobile motor 57 and a channel iron 58 of the automobile frame.

One plate of the insulator is secured to the channel iron 58. The other plate of the insulator is secured to the motor 58 through the agency of a bracket 59.

The modification of the invention illustrated in Figures 23 to 26 comprises a pair of plates 61 and 62 having interlocking parallel flanges of a type identical with that shown in Figures 17 to 22. The plates are formed with integral apertured lugs 63 and 64 at their corners which bear such a relation to the interlocking flanges that in the assembly of the insulator the lugs of the opposite plates will fall midway between each other.

An important feature of the invention is that in this type of insulator, and in certain other of the types described heretofore, such as that shown in Figures 19 and 20, the plates are vulcanized to the rubber cushion before bending. By this method the cost of curing molds is reduced and the manufacturing costs are cut as the insulators are more easily assembled, vulcanized and trimmed. It is also found that a better adhesion can be secured between the plates and the rubber by this method. The lugs of the front plate or of both plates may be bent up after the vulcanization of the rubber without having any adverse effect on either the rubber or the plates.

It will be apparent to those skilled in the art that this method of molding the plates flat and bending them to shape afterwards may be applied to almost any type of insulator including those shown in Figures 1 to 16 and is obviously not limited to the types of insulators shown herein.

While the bending of the plates of the insulator after the vulcanization thereof to the rubber cushion has only been described to form attaching flanges it will be seen that the invention can also be utilized to bend the body portion of an insulator such as shown in Figure 21 to give an insulator which may be vulcanized flat but which has angular rubber contacting faces.

The form of the invention shown in Figures 1 to 16 is illustrative of certain shapes that the cooperating flanges of the insulator plates may take, however the invention contemplates various other shapes such as oval, diamond, trapezoidal, polygonal or the like.

As many changes, other than those herein described, could be made, it is intended that all matter herein shown or described shall be interpreted as illustrative only and not in a limiting sense. Accordingly, various modifications of the invention can be resorted to without departing from the spirit of the invention or the scope of the appended claims.

What is claimed is:

1. A shock and vibration insulator comprising a pair of plates, and a rubber cushion vulcanized to and between said plates, said plates being formed with integral, bent up, spaced, interlocking flanges, certain of said flanges on each of said plates extending at an angle to other of said flanges on each of said plates, whereby rubber confined between said flanges will be compressed by relative motion of said plates in more than one direction.

2. A shock and vibration insulator comprising a pair of plates, and a rubber cushion vulcanized to and between said plates, said plates being formed with integral, bent up, spaced, interlocking flanges, said flanges forming a polygonal figure.

3. In combination with a supporting member and a supported member, a shock and vibration insulator connecting said members, said insulator comprising a pair of plates adapted to be respectively attached to said members, and a rubber cushion vulcanized to and between said plates, said plates being respectively formed with overlapping ledges extending interiorly through said rubber cushion whereby the portion of the rubber cushion included between said overlapping ledges will be placed under compressive stress, while the remainder of said rubber cushion will be placed under shear stress in transmitting loads from said supported member to said supporting member.

CURT SAURER.